United States Patent
Mork

(10) Patent No.: US 11,077,476 B2
(45) Date of Patent: Aug. 3, 2021

(54) METHODS AND COMPOSITIONS FOR IN SITU GROUNDWATER REMEDIATION

(71) Applicant: Benjamin V. Mork, Newport Beach, CA (US)

(72) Inventor: Benjamin V. Mork, Newport Beach, CA (US)

(73) Assignee: Mork Technologies, LLC, Tustin, CA (US)

( * ) Notice: Subject to any disclaimer, the term of this patent is extended or adjusted under 35 U.S.C. 154(b) by 147 days.

(21) Appl. No.: 15/988,284

(22) Filed: May 24, 2018

(65) Prior Publication Data

US 2018/0361443 A1    Dec. 20, 2018

Related U.S. Application Data

(60) Provisional application No. 62/510,630, filed on May 24, 2017.

(51) Int. Cl.
| | |
|---|---|
| B09C 1/00 | (2006.01) |
| B09C 1/10 | (2006.01) |
| B09C 1/08 | (2006.01) |
| C02F 3/34 | (2006.01) |
| C02F 1/68 | (2006.01) |
| C02F 103/06 | (2006.01) |
| C02F 1/28 | (2006.01) |

(52) U.S. Cl.
CPC ............... *B09C 1/002* (2013.01); *B09C 1/08* (2013.01); *B09C 1/10* (2013.01); *C02F 1/68* (2013.01); *C02F 3/342* (2013.01); B09C 2101/00 (2013.01); C02F 1/283 (2013.01); C02F 2103/06 (2013.01)

(58) Field of Classification Search
None
See application file for complete search history.

(56) References Cited

U.S. PATENT DOCUMENTS 9,770,743 B2 *   9/2017   Mork .................... B09C 1/08

OTHER PUBLICATIONS

Ruggaber, Timothy P; Talley, Jeffrey W; "Enhancing Bioremediation with Enzymatic Processes: A Review" Practice Periodical of Hazardous, Toxic, and Radioactive Waste Management, 10, 73-85, 2006 (Year: 2006).*

"Alternatives for Managing the Nation's Complex Contaminated Groundwater Sites", 2013, The National Academies Press. www.nap.edu.

Sirivithayapakorn, S., Keller, A. "Transport of colloids in saturated porous media: A pore-scale observation of the size exclusion effect and colloid acceleration", Water Resources Research, vol. 39, No. 4, p. 1109, Year: 2003.

Saleh, N., Sirk, K., Liu, Y., Phenrate, T., Dufour, B., Matyjaszewski, K., Tilton, R. D., Lowry, G. V., "Surface Modifications Enhance Nanoiron Transport and NAPL Targeting in Saturated Porous Media" 2007, Environmental Engineering Science, vol. 24, No. 1, p. 45.

(Continued)

*Primary Examiner* — David W Berke-Schlessel
(74) *Attorney, Agent, or Firm* — Sandra Thompson; Finlayson Toffer Roosevelt & Lilly LLP

(57) ABSTRACT

Groundwater, slurry, or soil treatment or remediation compositions and methods of both production and use are described that include: at least one colloidal remediation chemical, at least one polysaccharide stabilizer, and at least one enzyme.

13 Claims, 8 Drawing Sheets

(56) References Cited

OTHER PUBLICATIONS

Georgi, A., Schierz, A., Mackenzie, K., Kopinke, F.-D., "Colloidal activated carbon for in-situ groundwater remediation—Transport characteristics and adsorption of organic compounds in water-saturated sediment columns" Journal of Contaminant Hydrology, vol. 179, Aug. 2015, p. 76.
Borden, R., "Protocol for Enhanced In Situ Bioremediation Using Emulsified Edible Oil" 2006, Environmental Security Technology Certification Program, https://clu-in.org/download/contaminantfocus/dnapl/Treatment_Technologies/Edible-Oil-Protocol.pdf.

* cited by examiner

☒ Contaminated Groundwater Area 420

✖ Injection or application point 410

Figure 9 Activated Carbon Concentrations on Soil after water flush.
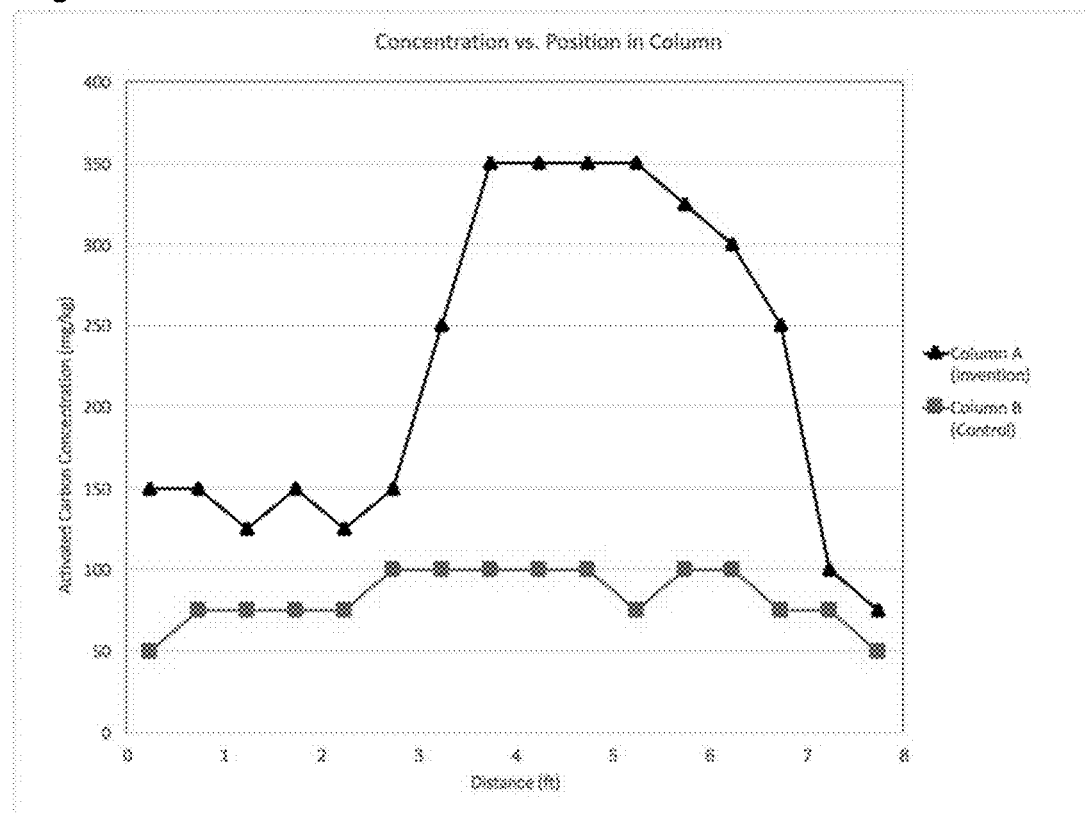

METHODS AND COMPOSITIONS FOR IN SITU GROUNDWATER REMEDIATION

This United States Utility patent application claims priority to U.S. Provisional Patent Application Ser. No. 62/510,630 entitled: "Methods and Compositions for In Situ Groundwater Remediation" filed on May 24, 2017, which is commonly-owned and incorporated in its entirety herein.

FIELD OF THE SUBJECT MATTER

The field of the subject matter is directed to methods and compositions that aid in the treatment or remediation of contaminated groundwater, soil, or a combination thereof.

BACKGROUND

There are thousands of contaminated sites in the United States in need of remediation.[1] Contamination at these sites, typically in groundwater and soil, results from past accidental or intentional releases of petroleum hydrocarbons, chlorinated solvents, pesticides, metals, and other industrially useful toxic chemicals. Types of contaminated sites include current or former military bases, gasoline stations, bulk fuel terminals, pipelines, dry cleaners, and industrial manufacturing facilities, among others.

Government regulators, property owners, responsible parties, and environmental consultants have significant ongoing efforts to clean up and manage these contaminated sites. Through a variety of available methods, stakeholders for contaminated sites work to balance regulatory requirements, human health risks, community concerns, environmental protection, and costs. Due to the high costs of remediation there is a need for new technologies that clean-up sites more effectively and at lower costs than currently available methods.

Groundwater remediation methods generally fall into one of three categories: In-situ methods, ex situ methods, and removal. In situ refers to in-place treatment of contaminated soil and water. This has the benefit of minimal disturbance to the site and can be lower cost than alternatives. Ex situ methods involve removing the water or soil from the ground for treatment, then placing it back into the site. For example, Pump & Treat is an ex situ method where water is pumped from the ground, purified (e.g. with activated carbon), and re-injected to the aquifer. Removal methods, including dig-and-haul, transport the contaminated soil or water to be disposed of at a hazardous waste facility. The site is then backfilled with clean materials. Removal methods have high success rates. however, they also have high costs and a large carbon footprint. In situ remediation methods are desirable for having lower costs, lower carbon footprint, and less disturbance to sites and surrounding communities. However, success rates of In Situ treatments are lower than desired due to the difficulties of locating the contamination and accurately reaching contaminated zones with treatments. There is a general need for new methods that improve effectiveness of In Situ remediation methods.

Injection of remediation agents into contaminated groundwater is a popular approach to site cleanup. A wide variety of chemical and biological agents are injected for remediation including reducing agents, oxidants, contaminant-degrading bacteria, sorbents, and compounds that stimulate bioremediation (biological electron donors and electron acceptors). Benefits of remediation by chemical injection are that it is relatively lower cost (e.g. compared to Pump & Treat), and fast-acting. In some cases, such as chemical oxidation, the contaminant treatment can be completed within weeks. Some of the key challenges of remediation by chemical injection are locating the contamination, delivering the remediation chemical from the point of injection to the zone of contamination, and minimizing detrimental impacts of remediation chemicals to groundwater quality.

Numerous water-soluble chemical agents are used for in situ chemical and biological remediation. Examples of soluble remediation chemicals are oxidants such as hydrogen peroxide and sodium persulfate, as well as electron donors such as sodium lactate. Soluble reagents often have a benefit of fast reactions with contaminants, however they have the limitation of only providing treatment for a short period of time.

Many insoluble or sparingly-soluble reagents such as iron filings or activated carbon are long lasting and very effective for contaminant treatment. They can be applied in situ by mechanical methods such as backfilling trenches or in situ mixing. These methods are costly, require heavy equipment, and involve significant disruption of activities at the site.

Permeable reactive barriers (PRBs) can be formed either by a trench or a series of chemical injections. These PRBs are vertical treatment zones installed perpendicular to groundwater flow and are intended to stay in place and treat the moving groundwater as it flows through. This approach prevents expansion of contaminated areas and isolates sources of contamination until they can be addressed directly. Positional stability of the remediation chemicals is an important feature of a PRB.

An alternative approach for introducing insoluble or sparingly soluble remediation chemicals is to apply them as colloidal dispersions (colloids). In this form, they behave as liquids and can easily be applied to contaminated sites by injection. A colloid is a suspension of very fine particles in a liquid, and the size of colloidal particles is typically in the range of 0.001-10 μm.[2] Colloids can be particularly useful for delivering insoluble chemicals to contaminated sites. Many chemical reagents that react or interact with groundwater contaminants are insoluble solids or liquids that do not flow through soil in their raw forms. In some cases, colloidal forms of these materials can be injected easily, allowing the reagents to flow through the aquifer. For example, iron metal, which chemically reduces chlorinated contaminants, can be applied as nanoscale zero valent iron (nZVI).[3] Activated carbon, known to be a good sorbent for organic contaminants, can applied to groundwater as activated carbon colloids (ACC).[4] Vegetable oil, which stimulates anaerobic biodegradation of chlorinated solvents, is most commonly applied as a colloid, emulsified vegetable oil (EVO).[5] These materials are all insoluble in water and are very difficult to inject in their pure solid or liquid forms.

Each remediation colloid has an optimal particle size range, pH range, and stabilizing agents that provide the best performance for remediation applications. In general, groundwater remediation colloids are designed to be as stable as possible against agglomeration, settling, and adhering to the soil, so that they can, in some instances be situationally mobile within their immediate area, and in other instances travel long distances during injection application and to reach contaminated zones. A powder slurry would clog and/or have an inhomogeneous distribution. Particle size of remediation colloids is selected to be small enough to transport through soil pores, typically <5 microns in diameter. Highly stabilized colloids can travel long distances through soil, allowing wider spacing of injection points and lower cost of application. They also enable treatment of zones that are difficult to reach, for example beneath buildings.

The properties of colloidal materials that enable their transport in groundwater also impart some significant limitations and disadvantages. The particles stay suspended in water longer than desired, they can migrate farther than intended, are detrimental to overall groundwater quality, and can interfere with groundwater analysis of contaminants.

After remediation colloids are injected to a target contaminated zone or PRB, their high stability can allow the chemicals to move further by diffusion or with the flow of groundwater. This is a problem in fast-moving aquifers, as the treatment chemicals will migrate away from the target zone, thus losing contact with contamination. The undesired migration could also result in accidental discharge of the treatment chemical to ecological receptors such as rivers and lakes.

The suspended particles also adversely impact the groundwater quality. Most colloidal reagents have high turbidity. Colloid treatments cause high groundwater turbidity for extended periods of time, leading to significant delays in returning the groundwater to pristine, pre-contamination conditions. Low turbidity is a standard component of overall groundwater quality. Depending on the colloid, complete destabilization and precipitation from groundwater can take weeks, months, or even years.

Groundwater analysis methods are adversely affected by residual colloids in groundwater. Treatment chemicals can react with contaminants in groundwater samples after collection and before analysis. This possibility casts doubt on the results of the chemical laden groundwater sample and causes delays in determining treatment outcomes and making decisions to close sites or require further treatment. Furthermore, the presence of the colloids may bias or interfere with analytical methods and instruments for groundwater analysis such as gas chromatography, ion chromatography, pH, ORP, mass spectrometry and dissolved oxygen (DO) measurements.

Contemplated embodiments address these limitations and provide additional new advantages for groundwater, slurry, and/or soil remediation with colloidal remediation agents.

SUMMARY OF THE SUBJECT MATTER

A groundwater treatment or remediation composition is disclosed that includes: at least one colloidal remediation chemical, at least one polysaccharide stabilizer, and at least one enzyme, which in some cases is a cellulase enzyme.

Methods of producing a groundwater treatment or remediation composition include: providing at least one colloidal remediation chemical, providing at least one polysaccharide stabilizer, providing at least one enzyme, combining the at least one colloidal remediation chemical and the at least one polysaccharide stabilizer to form a treatment precursor, depositing the treatment precursor into a water source to form a pretreatment mixture; and combining the pretreatment mixture with the at least one enzyme.

In addition, methods of producing a groundwater treatment or remediation composition are described herein that include: providing at least one colloidal remediation chemical, providing at least one polysaccharide stabilizer, providing at least one enzyme, and combining the at least one colloidal remediation chemical, the at least one polysaccharide stabilizer, and the at least one enzyme to form a treatment composition.

Methods of treating or remediating groundwater or soil include: providing contemplated groundwater treatment or remediation compositions, providing at least one zone of untreated groundwater or untreated soil, at least one zone of contaminated groundwater or contaminated soil, or a combination thereof, wherein the at least one zone has a water source; depositing at least part of the contemplated composition or compositions into the water source; and allowing the deposited composition to interact with the at least one zone of untreated groundwater or untreated soil, at least one zone of contaminated groundwater or contaminated soil, or a combination thereof.

Additional contemplated methods of treating or remediating groundwater or soil include: providing at least one colloidal remediation chemical, providing at least one polysaccharide stabilizer, providing at least one zone of untreated groundwater or untreated soil, at least one zone of contaminated groundwater or contaminated soil, or a combination thereof, wherein the at least one zone has a water source; depositing the at least one colloidal remediation chemical and the at least one polysaccharide stabilizer in at least part of the at least one zone of untreated groundwater or untreated soil, at least one zone of contaminated groundwater or contaminated soil, or a combination thereof; allowing the deposited composition to interact with the at least one zone of untreated groundwater or untreated soil, at least one zone of contaminated groundwater or contaminated soil, or a combination thereof; and adding at least one enzyme to the deposited composition, wherein the enzyme actively embeds and immobilizes at least part of the deposited composition in the at least one zone of untreated groundwater or untreated soil, at least one zone of contaminated groundwater or contaminated soil, or a combination thereof. In some embodiments, the enzyme activity embeds and immobilizes the at least one colloidal remediation chemical.

Figure 1:
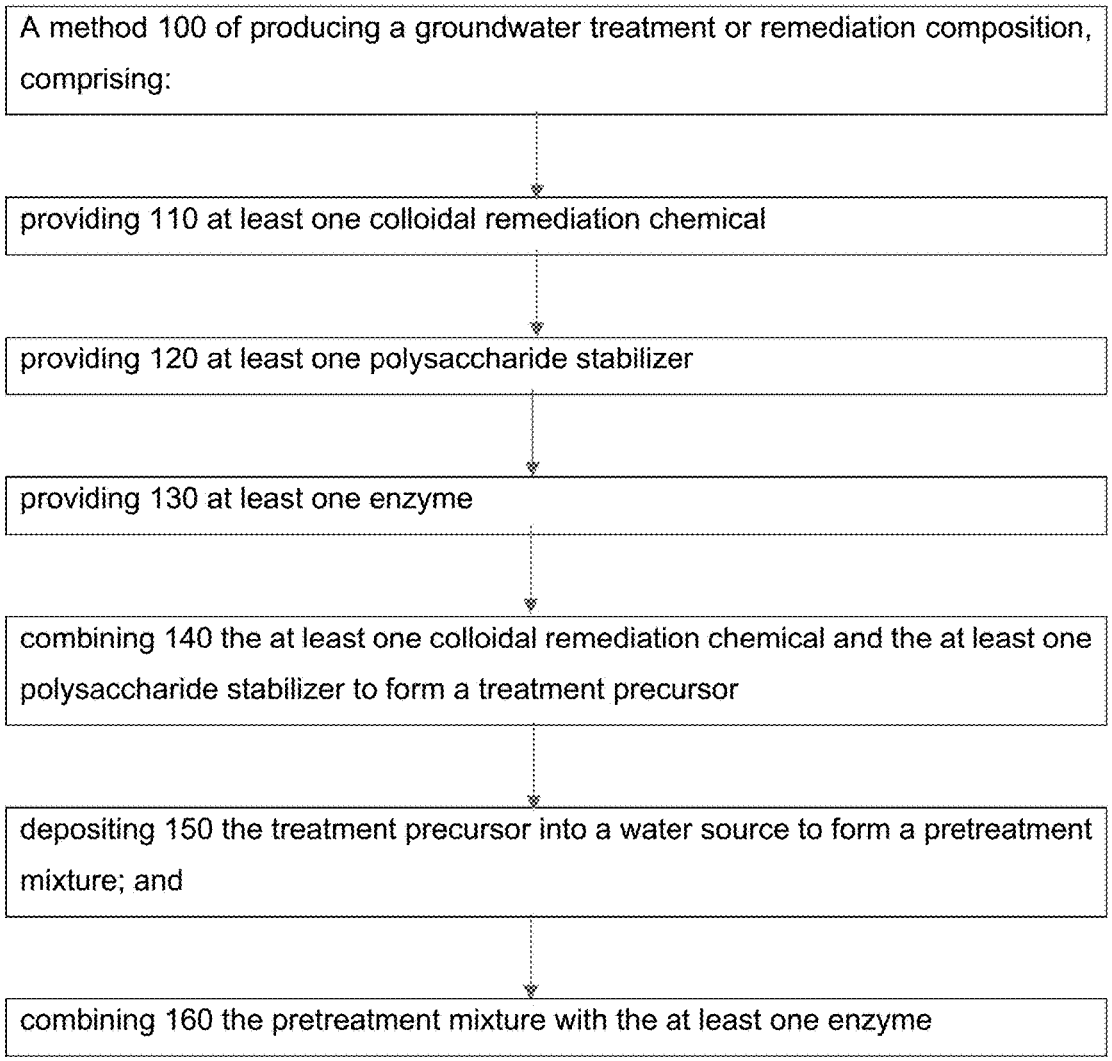
FIG. 1 shows a contemplated method of producing contemplated compositions.

The carbon concentration data is reported in Table 2 and plotted in FIG. 9.

DETAILED DESCRIPTION

This application discloses new in situ methods and compositions for treating contaminated groundwater, slurries, and soil. Contemplated embodiments can be described as targeted deposition and immobilization of colloidal remediation chemicals by controlled, enzymatic depolymerization of polysaccharide stabilizers.

Contemplated embodiments are designed to transport remediation agents through groundwater, slurries, and soil, then immobilize and embed them selectively at a desired position and time. In some embodiments, contemplated compositions may be deposited in surface water with the understanding that the compositions will migrate to, and in some embodiments through, a zone containing groundwater. One goal, however, is to prevent migration of colloidal remediation chemicals after application to the groundwater zone or once they reach the groundwater zone. Contemplated embodiments minimize the detrimental impacts of colloidal remediation agents on groundwater quality and groundwater analysis.

Specifically, a contemplated groundwater treatment or remediation composition is disclosed that includes: at least one colloidal remediation chemical, at least one polysaccharide stabilizer, and at least one enzyme. In additional contemplated embodiments, water is included as part of the groundwater treatment or remediation composition. It should be understood that contemplated compositions can be used to treat groundwater, contaminated water sources, slurries, soil, or a combination thereof. In some embodiments, the at least one enzyme comprises a cellulase enzyme.

As disclosed herein, contemplated compositions comprise at least one colloidal remediation chemical. Contemplated colloidal remediation chemicals include colloidal carbon, activated carbon colloids, or a combination thereof. In some embodiments, the at least one colloidal remediation chemical comprises about 0.01 to about 50 weight percent of the composition. In other embodiments, the at least one colloidal remediation chemical comprises about 0.01 to about 5 weight percent of the composition.

In contemplated embodiments, contemplated colloidal remediation chemicals may comprise any suitable diameter. In some embodiments, a contemplated diameter or particle size ranges from 0.1 to about 10 microns and collectively averages less than 5 microns. In other embodiments, a contemplated diameter or particle size averages less than 2 microns in a collection of colloidal remediation chemicals.

Contemplated compositions also include at least one polysaccharide stabilizer. In contemplated embodiments, remediation chemical colloids are stabilized with polysaccharide-based dispersants or stabilizers, such as carboxymethyl cellulose (CMC). Contemplated polysaccharide stabilizers prevent agglomeration and settling of colloid particles. They also assist in preventing deposition or straining of colloidal particles onto soil and facilitate transport of the colloid through groundwater and soil to reach the contaminated zone during application.

In contemplated embodiments, the at least one polysaccharide stabilizer comprises about 0.01 to about 20 weight percent of the composition. In other contemplated embodiments, the at least one polysaccharide stabilizer comprises about 0.01 to about 10 weight percent of the composition. In some embodiments, the at least one polysaccharide stabilizer comprises about 0.01 to about 5 weight percent of the composition. In yet other contemplated embodiments, the at least one polysaccharide stabilizer comprises about 0.01 to about 2 weight percent of the composition.

Contemplated embodiments also include at least one enzyme, which are considered, in some embodiments, as polysaccharide-degrading enzymes. In some contemplated embodiments, the at least one enzyme comprises a cellulase enzyme. Cellulase enzymes break the linkages in the polysaccharide chains, which shortens the chain length of the polysaccharides and depending on conditions can completely depolymerize the polysaccharides. Depolymerization of polysaccharides converts them into monomeric or oligomeric sugar molecules, which are not effective for stabilization of colloids in groundwater. The suspended colloids are then precipitated out of water and become immobilized as particles in the soil matrix. These particles then stay localized in the targeted area and provide treatment to the groundwater in and flowing through that zone.

In one embodiment, the type and grade of the at least one enzyme is selected for its desired activity (reaction rate) at the native pH and temperature of the site groundwater, slurry, soil, or combination thereof to be treated. In some embodiments, the transport distance and mobilization (or immobilization) degree and timing of the at least one remediation colloid can be controlled by selection of enzyme, polysaccharide, pH, injection rate, or a combination thereof. It should be understood that contemplated compositions can be easily tailored to the groundwater or treatment zone.

In contemplated embodiments, the at least one enzyme is included in a suitably active amount in order for it to actively engage with the other components. In some embodiments, the at least one enzyme or cellulase enzyme comprises about 0.001 to about 5 weight percent of the composition. In other contemplated embodiments, the at least one cellulase enzyme comprises about 0.001 to about 2 weight percent of the composition. In yet other embodiments, the at least one enzyme or cellulase enzyme comprises about 0.001 to about 0.5 weight percent of the composition. In additional contemplated embodiments, the at least one cellulase enzyme comprises about 0.001 to about 0.2 weight percent of the composition.

There are at least two different methods of forming or producing contemplated compositions. In one contemplated method of producing 100 a groundwater treatment or remediation composition, the method includes: providing 110 at least one colloidal remediation chemical, providing 120 at least one polysaccharide stabilizer, providing 130 at least one enzyme, combining 140 the at least one colloidal remediation chemical and the at least one polysaccharide stabilizer to form a treatment precursor, depositing 150 the treatment precursor into a water source to form a pretreatment mixture; and combining 160 the pretreatment mixture with the at least one enzyme, as shown in FIG. 1. As is clear, when all the above-mentioned constituents are added, the contemplated treatment composition is in its claimed form. In some embodiments, the at least one enzyme comprises a cellulase enzyme.

In contemplated embodiments, the term "deposited" is used to mean any method of dumping, discharging, applying, draining, emptying, inserting, injecting, plunging, embedding, or otherwise adding the particular constituent, treatment precursor, or other contemplated composition or mixture into another body, container, or water source.

Figure 2:
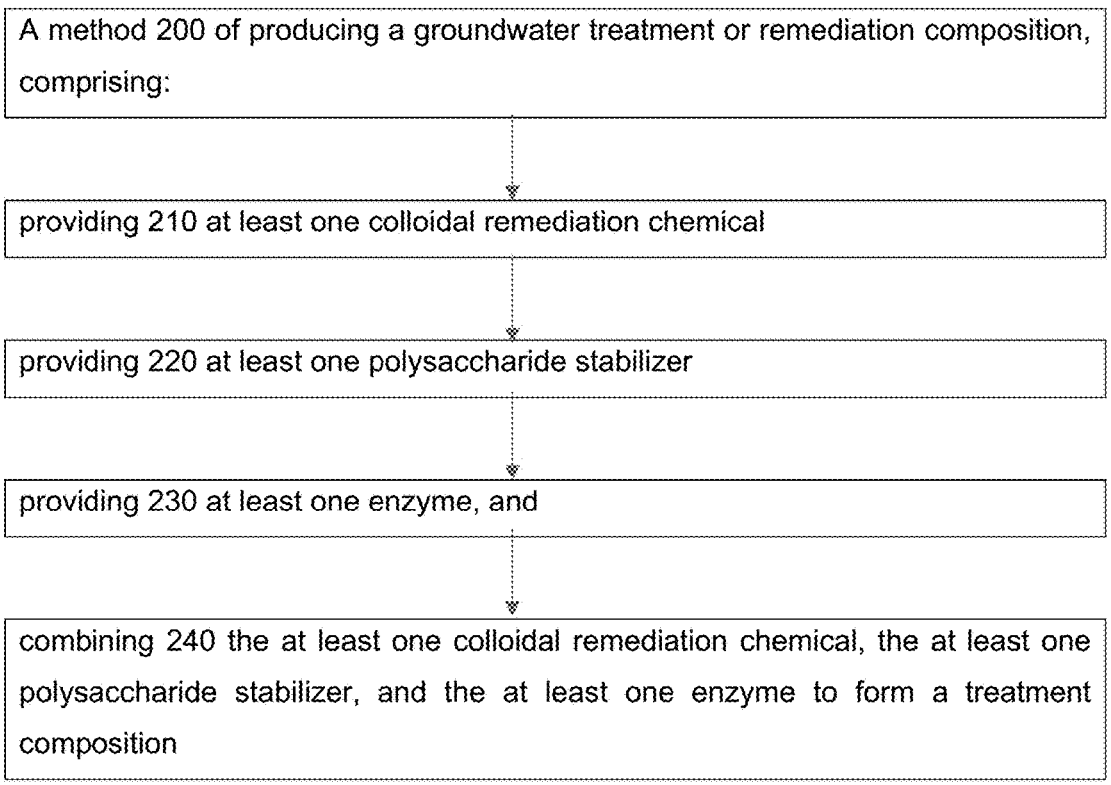
FIG. 2 shows a contemplated method of producing contemplated compositions.

Another contemplated method 200 of producing a groundwater treatment or remediation composition includes: providing 210 at least one colloidal remediation chemical, providing 220 at least one polysaccharide stabilizer, providing 230 at least one enzyme, and combining 240 the at least one colloidal remediation chemical, the at least one polysaccharide stabilizer, and the at least one cellulase enzyme to form a treatment composition, as shown in FIG. 2. The treatment composition may have water added or may then be added to a water source. In some embodiments, the at least one enzyme comprises a cellulase enzyme.

As mentioned, in additional contemplated embodiments, water is included as part of the groundwater treatment or remediation composition. Water may be added to contemplated compositions in a pure or "tap" form to be a part of the composition. In some embodiments, contemplated compositions may be added to the water source to be treated or that leads to the water to be treated. That water source or contaminated water can also be included as the "water", as used herein. As used herein, the phrase "water source" may mean a body of contaminated water or groundwater, it may mean the area of water that feeds the body of contaminated water or groundwater, or it may mean the area of water that is between the body of contaminated water or groundwater and the area that contains usable water, such as water to be used for crops or for drinking water. In some embodiments, a contemplated "water source" may contain some contamination that is similar to, but less in scope of, the body or zone of targeted contaminated water or groundwater that is to be ultimately treated. In addition, the term "untreated", as used herein, means a body of water, slurry, or soil that has yet to be treated. The term "untreated" does not necessarily mean contaminated.

Figure 3:
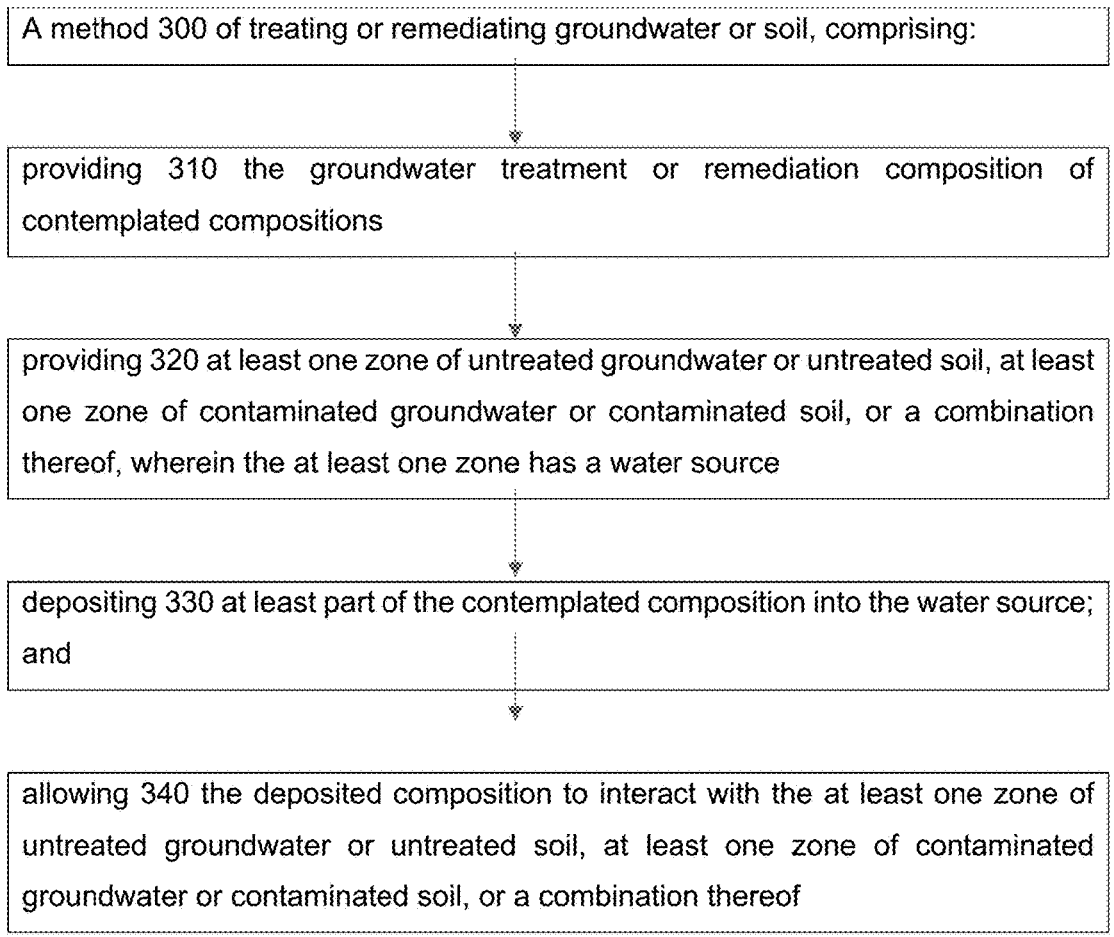
FIG. 3 shows a contemplated method of utilizing contemplated compositions.
Figure 4:
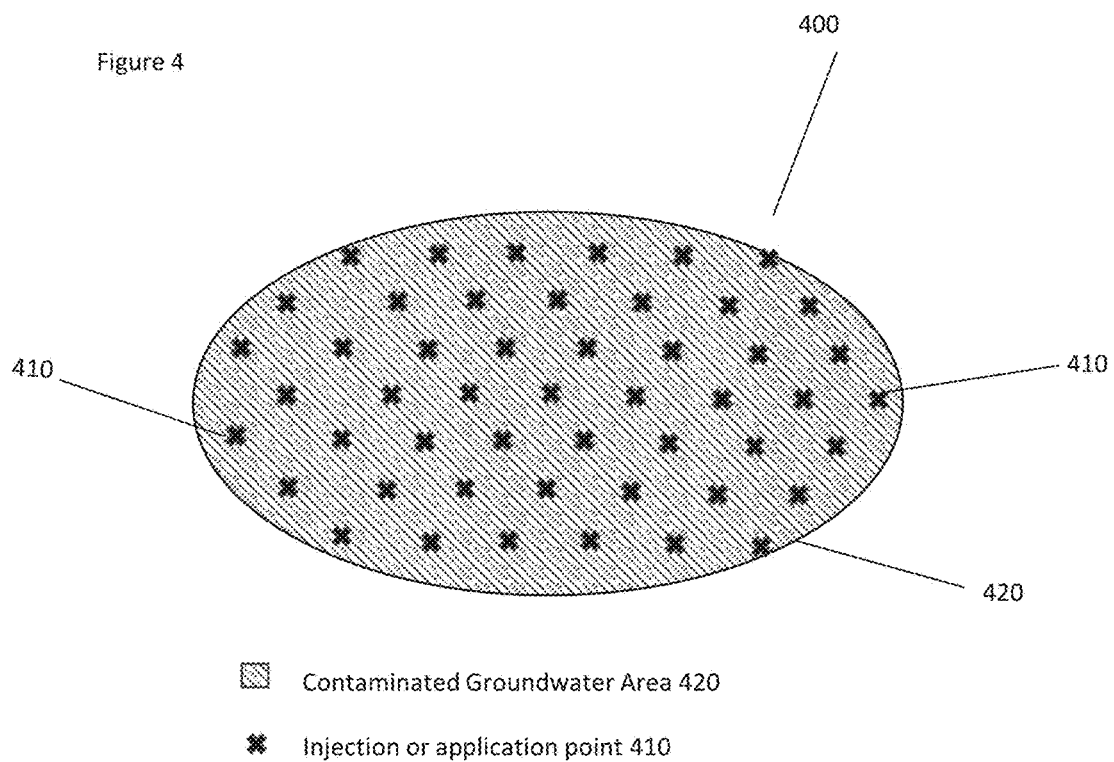
FIG. 4 shows an overhead view of a contemplated embodiment of this method, wherein the contemplated groundwater treatment or remediation compositions are deposited at various application points by injecting the contemplated groundwater treatment or remediation compositions in specific spots throughout the contaminated or treatment area.
Figure 5:
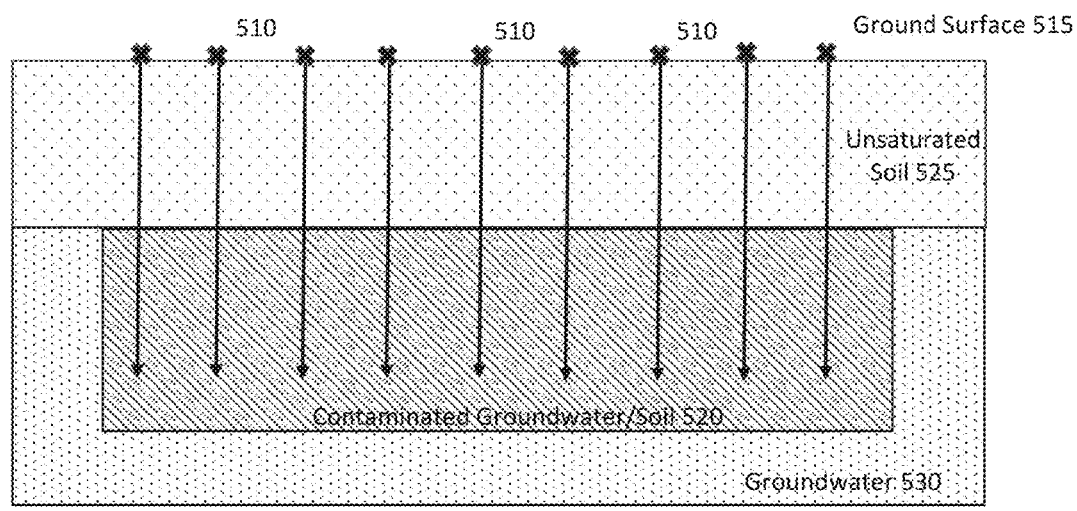
FIG. 5 shows a side view of the embodiment shown in FIG. 4.

Contemplated methods 300 of treating or remediating groundwater or soil include and are shown in FIG. 3: providing 310 contemplated groundwater treatment or remediation compositions, providing 320 at least one zone of untreated groundwater or untreated soil, at least one zone of contaminated groundwater or contaminated soil, or a combination thereof, wherein the at least one zone has a water source; depositing 330 at least part of the contemplated composition or compositions into the water source; and allowing 340 the deposited composition to interact with the at least one zone of untreated groundwater or untreated soil, at least one zone of contaminated groundwater or contaminated soil, or a combination thereof. FIG. 4 shows an overhead view 400 of a contemplated embodiment of this method, wherein the contemplated groundwater treatment or remediation compositions are deposited at various application points 410 by injecting the contemplated groundwater treatment or remediation compositions in specific spots throughout the contaminated 420 or treatment area. FIG. 5 shows a side view of the embodiment shown in FIG. 4. In FIG. 5, the injection points 510 can be seen on the ground surface 515. The contemplated compositions that are injected into the injection points 510 travel through the unsaturated soil 525 and into the contaminated groundwater/soil combination 520 and into the contaminated groundwater 530.

Figure 6:
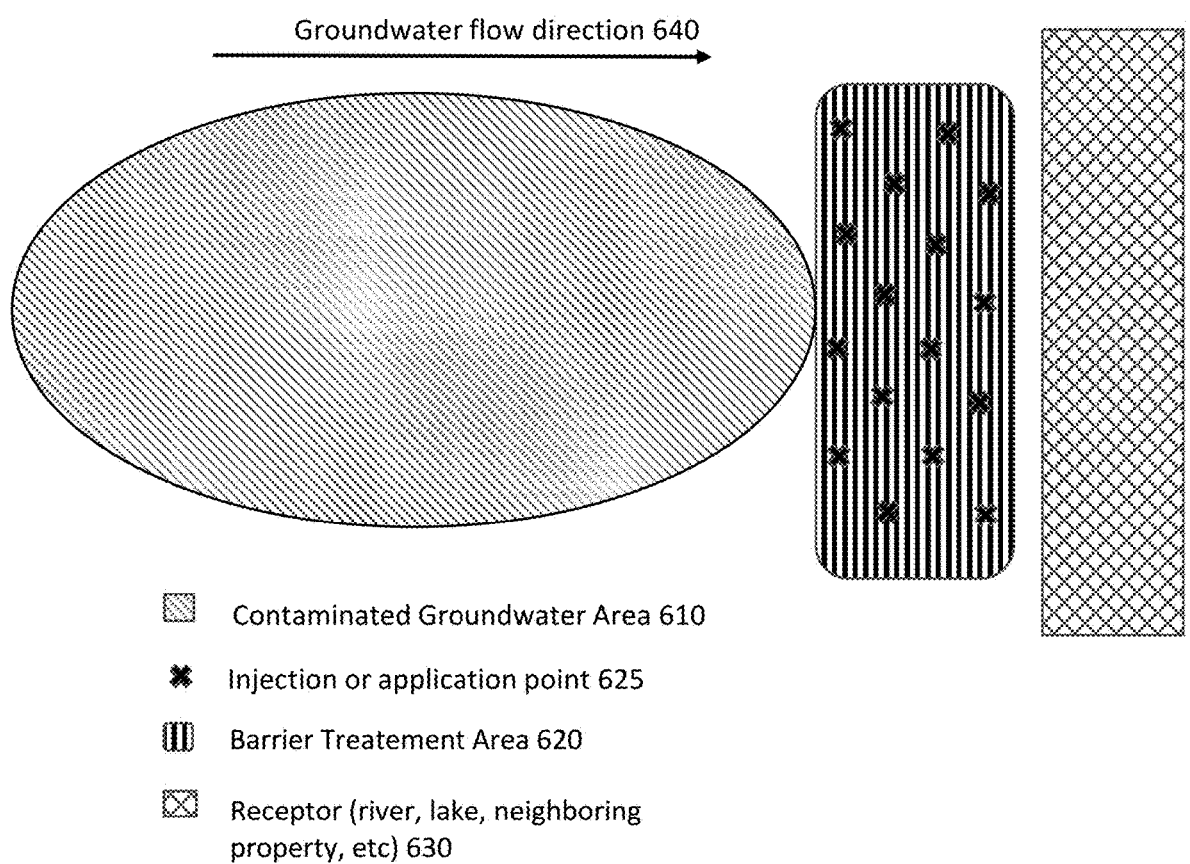
FIG. 6 shows a contemplated embodiment, wherein the deposited composition is deposited after the area of contamination but before the usable zone of water or soil, so that the contaminated groundwater or contaminated slurry travels to and through the deposited composition on its way to the usable zone of water or soil.
Figure 7:
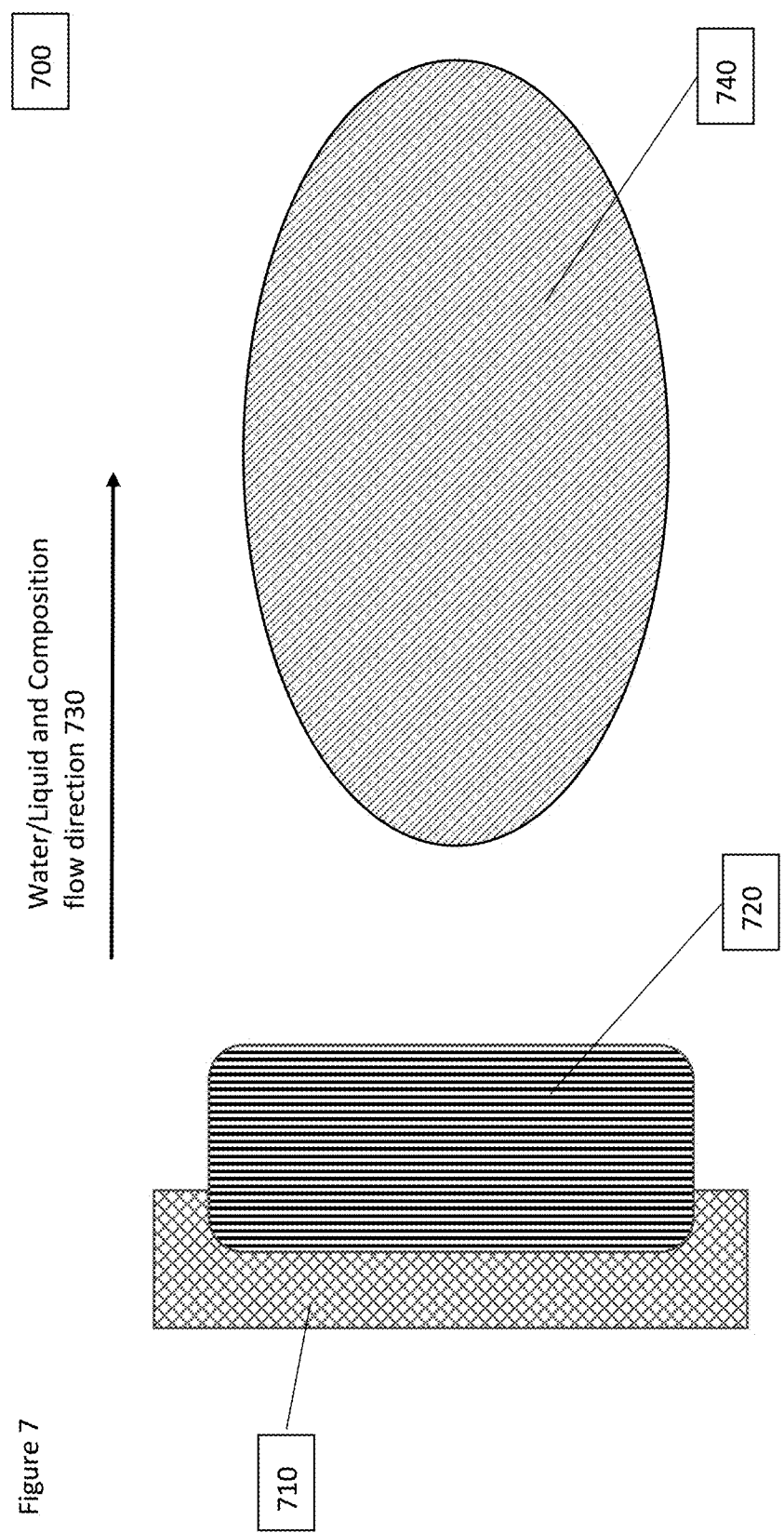
FIG. 7 shows a contemplated embodiment where the deposited composition is deposited ahead of the contaminated groundwater or contaminated soil where the composition is allowed to flow to and through the area of contamination.

As used herein, the phrase "allowing the deposited composition to interact with" means that the deposited composition may be deposited directly into the contaminated groundwater or contaminated soil, the deposited composition may be deposited ahead of the contaminated groundwater or contaminated soil where the composition is allowed to flow to and through the area of contamination, or the deposited composition may be deposited after the area of contamination but before the usable zone of water or soil, so that the contaminated groundwater or contaminated soil slurry travels to and through the deposited composition on its way to the usable zone of water or soil. FIG. 6 shows a contemplated embodiment that demonstrates how the phrase "allowing the deposited composition to interact with" is put into practice, which can also be called barrier treatment 600. In this Figure, the deposited composition is deposited at at least one injection point 625 in the barrier treatment area 620 after the area of contamination 610 but before the usable 630 zone of water or soil, so that the contaminated groundwater or contaminated soil slurry travels 640 to and through the deposited composition on its way to the usable zone of water or soil. FIG. 7 shows a contemplated embodiment 700 where the deposited composition 720 is deposited ahead of the contaminated groundwater or contaminated soil in and/or near surface water 710, for example, where the deposited composition is allowed to flow to and through 730 the area of contamination 740. This example can be put into practice in places where the groundwater may be under a building or structure, such as a gas station, and there is a feeder pond or stream that is not contaminated.

Figure 8:
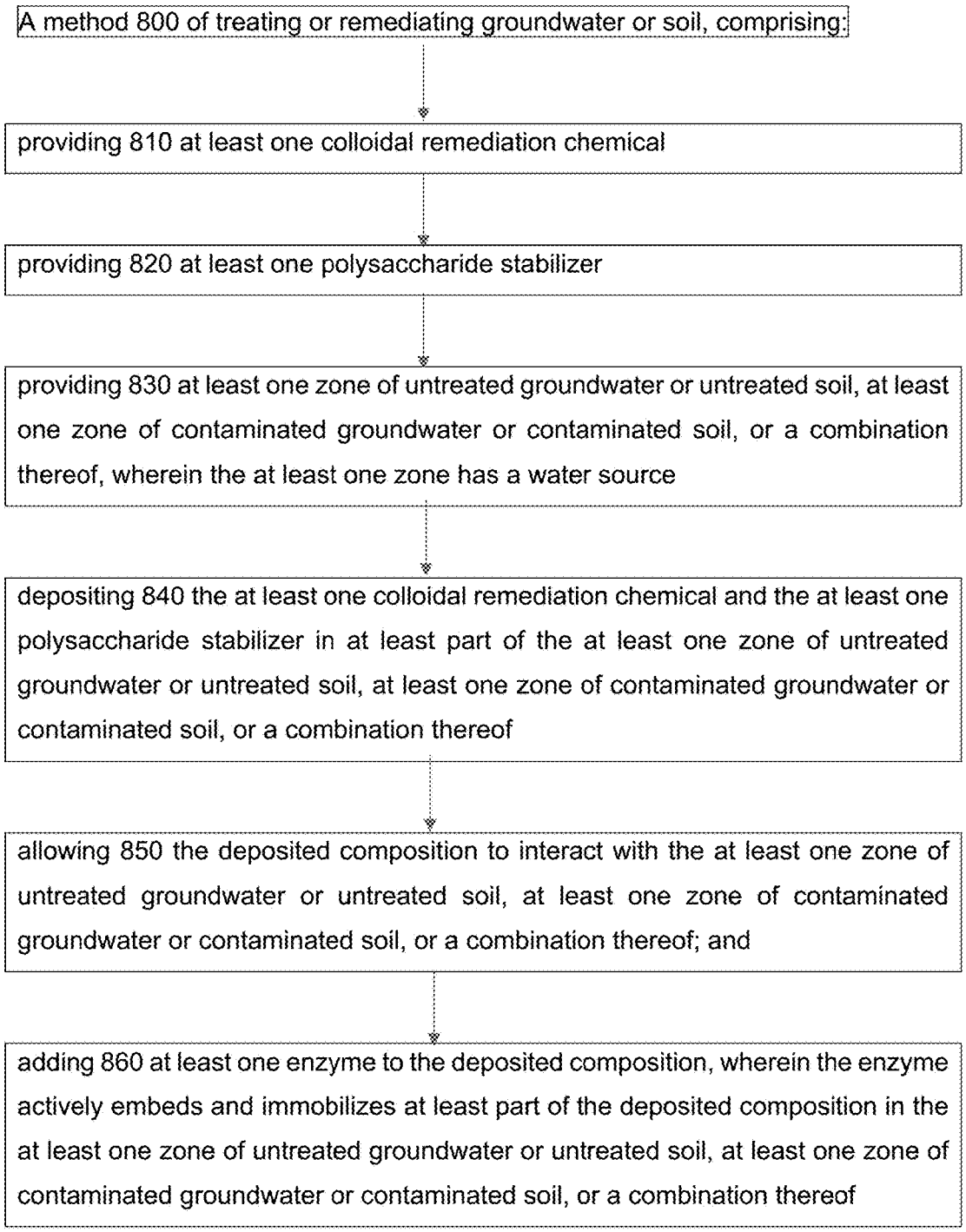
FIG. 8 shows a contemplated method of utilizing contemplated compositions.

Additional contemplated methods 800 of treating or remediating groundwater or soil include and are shown in FIG. 8: providing 810 at least one colloidal remediation chemical, providing 820 at least one polysaccharide stabilizer, providing 830 at least one zone of untreated groundwater or untreated soil, at least one zone of contaminated groundwater or contaminated soil, or a combination thereof, wherein the at least one zone has a water source; depositing 840 the at least one colloidal remediation chemical and the at least one polysaccharide stabilizer in at least part of the at least one zone of untreated groundwater or untreated soil, at least one zone of contaminated groundwater or contaminated soil, or a combination thereof; allowing 850 the deposited composition to interact with the at least one zone of untreated groundwater or untreated soil, at least one zone of contaminated groundwater or contaminated soil, or a combination thereof; and adding 860 at least one enzyme to the deposited composition, wherein the enzyme actively embeds and immobilizes at least part of the deposited composition in the at least one zone of untreated groundwater or untreated soil, at least one zone of contaminated groundwater or contaminated soil, or a combination thereof. In some embodiments, the enzyme activity embeds and immobilizes the at least one colloidal remediation chemical. In other embodiments, the at least one enzyme comprises a cellulase enzyme.

As mentioned, contemplated enzymes can be added separately in order to actively embed and immobilize the deposited composition in the at least one zone of untreated groundwater or untreated soil, at least one zone of contaminated groundwater or contaminated soil, or a combination thereof. Carboxymethyl cellulose and other polysaccharide-based colloid stabilizers can be depolymerized by either enzymatic or chemical methods. Chemical methods typically involve extreme pH and temperature conditions and are not practical for in situ groundwater remediation. These methods would be costly and detrimental to groundwater quality. For example, acidic pH conditions (pH<4) could leach naturally occurring metals from soil into groundwater and create an additional problem of metals contamination. Enzymatic hydrolysis (depolymerization) of polysaccharide stabilizers can proceed at or near neutral pH, and at temperatures typical for groundwater, around 15° C. Enzymatic hydrolysis is therefore ideal for hydrolysis of CMC and other polysaccharides in groundwater.

Contemplated embodiments include a method of remediation of groundwater, comprising, and in some embodiments, consisting of: preparation of a colloidal remediation agent mixture in water, stabilized with at least one polysaccharide stabilizer or dispersant; addition of a polysaccharide-degrading enzyme to the colloidal mixture; application of the colloidal mixture to flow through a contaminated aquifer and reach a contaminated zone; and deposition and immobilization of the colloidal remediation agent particles in the target zone.

Contemplated embodiments are designed to enable selective immobilization of colloidal groundwater treatment chemicals in a targeted aquifer zone. After deposition, the remediation chemicals are embedded in the aquifer soil and are immobile. This has several benefits over the prior art, including:

1) Remediation chemicals stay in the targeted zone or PRB after application and as groundwater migrates.
2) Targeted deposition and immobilization allows use of less chemical reagent.
3) Faster treatment and higher success rates due to higher concentration of treatment in target contaminant zone
4) Groundwater becomes clear and is free of treatment chemicals much sooner, enabling more accurate analysis of contaminants
5) Less detrimental impact to general groundwater quality (e.g. turbidity)

A contemplated embodiment is demonstrated in Example 1 below using activated carbon colloids (ACC) stabilized with sodium carboxymethyl cellulose (CMC). In this example, contemplated embodiments immobilized more than 95% of the ACC in the treated column, and the majority located in the target zone. In the control, a colloid representative of prior art only deposited 11% of the AC after 6 days, and the remainder flushed out of the column with water.

In another embodiment, the transport distance and mobilization (or immobilization) degree and timing of the at least one remediation colloid can be controlled by selection of enzyme, polysaccharide, pH, injection rate, or a combination thereof. It should be understood that contemplated compositions can be easily tailored to the groundwater or treatment zone.

In another embodiment, a buffer is added to the colloidal mixture to obtain the desired pH for the enzyme, allowing immobilization of the remediation chemical at the targeted distance and time from injection.

The prior art teaches that many different remediation chemicals can be stabilized as colloids, therefore contemplated embodiments is expected to be useful for delivery for various types of remediation agents including but not limited to reducing agents, oxidants, electron donors, electron acceptors, catalysts, sorbent materials, metal-binding agents, and microbial cultures.

Examples of reducing agents that could be delivered by contemplated embodiments include but are not limited to zero valent iron, ferrosilicon, iron-palladium alloy, and other metals and alloys that can chemically reduce contaminants, such as chlorinated solvents.

Examples of electron donors that could be delivered by contemplated embodiments include but are not limited to insoluble or sparingly soluble organics such as vegetable oils, triglycerides, proteins, polylactates, waxes, fatty acids, and fatty acid esters.

Examples of sorbent materials that could be delivered by contemplated embodiments include but are not limited to activated carbon, zeolites, surfactant-modified zeolites, ion-exchange resins, and humic materials.

Examples of electron acceptors that could be delivered by contemplated embodiments include but are not limited to calcium sulfate, gypsum, and oxygen-releasing materials such as magnesium peroxide, calcium peroxide, and calcium oxyhydroxide.

Examples of catalysts that could be delivered by contemplated embodiments include but are not limited to heterogeneous catalysts, zeolites, metal oxides, metal hydroxides, metal sulfides, and surface-supported metal particles and complexes.

Examples of oxidizing agents that could be delivered by contemplated embodiments include but are not limited to oxidants such as hydrophobic organic peroxides.

Examples of polysaccharide stabilizers or dispersants that can be used in contemplated embodiments include but are not limited to carboxymethyl cellulose (CMC), xanthan gum, guar gum, locust bean gum, hydroxymethyl cellulose, and hydroxypropyl cellulose.

Examples of enzymes that can be used in contemplated embodiments include but are not limited to cellulase enzymes, cellulase enzyme mixtures, cellulase derived from *Aspergillus Niger*, beta-1,4-glucanase, beta-1,4-endoglucanase, and alkaline cellulases. Cellulase enzyme mixtures and grades suitable for use in food processing are preferred for environmental remediation applications.

Example 1: Controlled Colloid Deposition in Laboratory Columns

Two clear PVC columns (2"×10') were assembled vertically and fitted with needle valves at their base to regulate water flow. Each column was then loaded with 8 feet of water-saturated #30 sand. Approximately 2 L of water was slowly flowed through each column for equilibration. To Column A (Contemplated Embodiment) was added 1,000 mL of activated carbon colloid (ACC) containing 2,500 mg/L activated carbon (d90<2 micron), 1,250 mg/L carboxymethyl cellulose (CMC), 780 units (U) of cellulase enzyme derived from *Aspergillus Niger* (Sigma Aldrich), and 2.15 g of sodium acetate buffer (0.238M sodium acetate, 0.062 M acetic acid). To Column B (Control) was added 1,000 mL of ACC containing 2,500 mg/L of activated carbon (d90<2 micron), and 1250 mg/L CMC. Flow rates of the columns were maintained at about 60 mL/min, simulating relatively fast flow of remediation fluids during injection, deposition, or application. The black fluids flowed homogeneously into the soil columns, and water was added to the tops of the columns to chase the fluids into the soil matrix. Column flow was stopped after the fronts of the black colloids reached approximately 6.5 feet from the top of the sand. Most the dark black fluid appeared to reside between approximately 2.5 and 6.5 feet in both columns, indicating both colloids transported effectively through the sand at low pressure.

After 6 days, approximately 4.5 L (2.3 pore volumes) of water was flowed through each column at a rate of 15 mL/min and the effluents were retained for analysis. Column A eluted clear water for the first 500 mL, then the water became light gray, indicating a small amount of activated carbon was eluted. The dark black zone between 2 and 7 feet did not appear to move with the water flow. The effluent from column B became extremely dark black within the first 500 mL, indicating that significant amounts of colloidal carbon were flowing out of the column. The dark black zone migrated with the flow of water and into the captured effluent. The concentration of colloidal carbon in the combined effluent for each column was quantified by visual comparison to a series of standards, and the results are reported in Table 1. For analysis, the sample from column B was diluted by a factor of 20 into a visually measurable range.

TABLE 1

Carbon Colloid Elution and Deposition

| Effluent Sample | Dilution Factor | Carbon Concentration (measured) | Carbon Concentration (effluent) | Effluent Volume Captured | Mass of Carbon Eluted | % Carbon Eluted from Column | % Carbon Immobilized on Column |
|---|---|---|---|---|---|---|---|
| Column A (Contemplated Embodiment) | 1 | 30 mg/L | 30 mg/L | 4,469 mL | 134 mg | 5% | 95% |
| Column B (Control) | 20 | 25 mg/L | 500 mg/L | 4,475 mL | 2234 mg | 89% | 11% |

The effluent analysis data in Table 1 demonstrates that within 6 days, a contemplated embodiment deposited and immobilized 95% of the activated carbon colloid onto soil, leaving only 5% of the colloid in the water phase. This column simulates the effect of contemplated embodiments in groundwater, enabling the remediation colloid to be injected through a target distance then selectively deposited at a desired location in an aquifer. In contrast, the control column eluted 89% of the carbon colloid that had been added. This demonstrates some of the limitations discussed above. Contemplated embodiments are effective at immobilizing remediation colloids after injection, overcoming limitations of the prior art.

The two columns were then allowed to drain completely and disassembled. Each 0.5 foot section of sand was collected and mixed into a homogeneous sample. To determine approximate concentration of activated carbon in each section, the sand was visually compared to a series of wet sand standards with carbon concentrations between 0 and 400 mg/kg. The carbon concentration data is reported in Table 2 and plotted in FIG. 9. Analysis of the carbon concentrations on sand indicates that contemplated embodiments were effective at depositing activated carbon selectively in the target zone, between about 2.5 and 6.5 feet, with concentrations as high as 350 mg/kg in the target area. In contrast, most of the ACC was eluted from the control column and only lower levels were deposited on soil (50-100 mg/kg), even in the targeted zone. The plot in FIG. 9 shows the targeted immobilization and illustrates the difference between contemplated embodiments and the prior art for selectively immobilizing colloids. This experiment also showed that by utilizing contemplated embodiments, remediation colloids can transport at least 6.5 feet through sandy soil before they are immobilized. It is expected that in larger demonstration columns and in actual remediation sites this approach could be used to transport and then immobilize remediation agents over larger distances, up to 20 feet or more.

TABLE 2

Activated Carbon Concentration on sand after water flush

| | Carbon Concentration (mg/kg) | |
|---|---|---|
| Position | Column A (Contemplated Embodiment) | Column B (control) |
| 0-0.5' | 150 | 50 |
| 0.5-1' | 150 | 75 |
| 1-1.5' | 125 | 75 |
| 1.5-2' | 150 | 75 |
| 2-2.5' | 125 | 75 |
| 2.5-3' | 150 | 100 |
| 3-3.5' | 250 | 100 |
| 3.5-4' | 350 | 100 |
| 4-4.5' | 350 | 100 |
| 4.5-5' | 350 | 100 |
| 5-5.5' | 350 | 75 |
| 5.5-6' | 325 | 100 |
| 6-6.5' | 300 | 100 |
| 6.5-7' | 250 | 75 |
| 7-7.5' | 100 | 75 |
| 7.5-8' | 75 | 50 |

REFERENCES

1) "Alternatives for Managing the Nation's Complex Contaminated Groundwater Sites", 2013, The National Academies Press.www.nap.edu
2) Sirivithayapakorn, S., Keller, A. "Transport of colloids in saturated porous media: A pore-scale observation of the size exclusion effect and colloid acceleration", Water Resources Research, Vol. 39, No. 4, p. 1109
3) Saleh, N., Sirk, K., Liu, Y., Phenrate, T., Dufour, B., Matyjaszewski, K., Tilton, R. D., Lowry, G. V., "Surface Modifications Enhance Nanoiron Transport and NAPL Targeting in Saturated Porous Media" 2007, Environmental Engineering Science, vol. 24, no. 1, p. 45.
4) Georgi, A., Schierz, A., Mackenzie, K., Kopinke, F.-D., "Colloidal activated carbon for in-situ groundwater remediation—Transport characteristics and adsorption of organic compounds in water-saturated sediment columns" Journal of Contaminant Hydrology, vol 179, August 2015, p. 76.
5) Borden, R., "Protocol for Enhanced In Situ Bioremediation Using Emulsified Edible Oil" 2006, Environmental Security Technology Certification Program, https://clu-in.org/download/contaminatntfocus/dnapl/Treatment_Technologies/Edible-Oil-Protocol.pdf Thus, specific embodiments, compositions, methods of production and use of compositions for in situ groundwater, slurry, or soil treatment or remediation have been disclosed. It should be apparent, however, to those skilled in the art that many more modifications besides those already described are possible without departing from the inventive concepts herein. The inventive subject matter, therefore, is not to be restricted except in the spirit of the disclosure herein.

Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method of treating or remediating groundwater or soil, comprising:
   providing at least one colloidal remediation chemical,
   providing at least one polysaccharide stabilizer,
   providing at least one zone of untreated groundwater or untreated soil, at least one zone of contaminated groundwater or contaminated soil, or a combination thereof, wherein the at least one zone has a water source;
   depositing the at least one colloidal remediation chemical and the at least one polysaccharide stabilizer in at least part of the at least one zone of untreated groundwater or untreated soil, at least one zone of contaminated groundwater or contaminated soil, or a combination thereof;
   allowing the deposited composition to interact with the at least one zone of untreated groundwater or untreated soil, at least one zone of contaminated groundwater or contaminated soil, or a combination thereof; and
   adding at least one enzyme to the deposited composition, wherein the enzyme embeds and immobilizes at least part of the deposited composition in the at least one zone of untreated groundwater or untreated soil, at least one zone of contaminated groundwater or contaminated soil, or a combination thereof.

2. The method of claim 1, wherein the enzyme embeds and immobilizes at least part of the at least one colloidal remediation chemical in the at least one zone of untreated groundwater or untreated soil, at least one zone of contaminated groundwater or contaminated soil, or a combination thereof.

3. The method of claim 1, wherein the groundwater treatment or remediation composition further comprises water.

4. The method of claim 1, wherein the at least one colloidal remediation chemical comprises about 0.01 to about 50 weight percent of the composition.

5. The method of claim 4, wherein the at least one colloidal remediation chemical comprises about 0.01 to about 5 weight percent of the composition.

6. The method of claim 1, wherein the at least one polysaccharide stabilizer comprises about 0.01 to about 20 weight percent of the composition.

7. The method of claim 6, wherein the at least one polysaccharide stabilizer comprises about 0.01 to about 5 weight percent of the composition.

8. The method of claim 1, wherein the at least one enzyme comprises about 0.001 to about 5 weight percent of the composition.

9. The method of claim 8, wherein the at least one enzyme comprises about 0.001 to about 2 weight percent of the composition.

10. The method of claim 1, wherein the at least one colloidal remediation chemical comprises at least one reducing agent, at least one electron acceptor, at least one catalyst, at least one sorbent material, at least one metal-binding agent, at least one microbial culture, or a combination thereof.

11. The method of claim 1, wherein the at least one enzyme comprises a cellulase enzyme.

12. The method of claim 10, wherein the at least one reducing agent comprises at least one electron donor.

13. The method of claim 1, wherein the at least one colloidal remediation chemical comprises at least one oxidant.

* * * * *